United States Patent
Song et al.

(10) Patent No.: US 8,320,316 B2
(45) Date of Patent: Nov. 27, 2012

(54) METHOD FOR ACCELERATING TERMINAL OF WIRELESS COMMUNICATION SYSTEM ACCESSING NETWORK

(75) Inventors: Jianquan Song, Shenzhen (CN); Li Chu, Shenzhen (CN); Ling Xu, Shenzhen (CN); Ning Wang, Shenzhen (CN); Zheng Huang, Shenzhen (CN)

(73) Assignee: ZTE Corporation (CN)

( * ) Notice: Subject to any disclaimer, the term of this patent is extended or adjusted under 35 U.S.C. 154(b) by 441 days.

(21) Appl. No.: 12/670,399

(22) PCT Filed: Dec. 29, 2007

(86) PCT No.: PCT/CN2007/003921
§ 371 (c)(1),
(2), (4) Date: Jan. 22, 2010

(87) PCT Pub. No.: WO2009/015540
PCT Pub. Date: Feb. 5, 2009

(65) Prior Publication Data
US 2010/0195534 A1    Aug. 5, 2010

(30) Foreign Application Priority Data

Jul. 31, 2007   (CN) .......................... 2007 1 0143444

(51) Int. Cl.
*H04W 4/00*   (2009.01)
(52) U.S. Cl. ...................................... 370/329; 455/435.2
(58) Field of Classification Search .................. None
See application file for complete search history.

(56) References Cited

U.S. PATENT DOCUMENTS

| | | | |
|---|---|---|---|
| 7,171,216 B1 * | 1/2007 | Choksi ........................ | 455/456.1 |
| 7,542,451 B2 * | 6/2009 | Cooper et al. ................. | 370/335 |
| 2007/0286120 A1 * | 12/2007 | Dang ............................ | 370/328 |
| 2008/0095073 A1 * | 4/2008 | Dang ............................ | 370/254 |

(Continued)

FOREIGN PATENT DOCUMENTS

CN      1653757 A      8/2005

(Continued)

OTHER PUBLICATIONS

Zhang, Peng, "The Enhancement of the MAC Management Messages for the NSP Enumeration and Selection," IEEE C802.16g-043rl, Sep. 13, 2005, pp. 2-7.

(Continued)

*Primary Examiner* — Brian Roberts
(74) *Attorney, Agent, or Firm* — Marger Johnson & McCollom, P.C.

(57) ABSTRACT

A method for accelerating network accessing of a terminal in a wireless communication system, comprises: a wireless terminal receiving system parameter information, and after obtaining system information of a base station identifier (BS ID) and a network access provider identifier (NAP ID), immediately judging validity of the NAP ID, or validity of both the NAP ID and the BS ID; if a result of the judgment is "valid", the terminal proceeding to a subsequent procedure of the network discovery and selection according to information stored in the terminal, otherwise, carrying out a new procedure of network discovery and selection. The method avoids continuing to perform processes such as message receiving and decoding in the case that a NAP ID or a BS ID is invalid according to a procedure in the current protocol, thereby increasing the speed of network accessing of a terminal.

7 Claims, 1 Drawing Sheet

Figures of Specification

U.S. PATENT DOCUMENTS

2008/0133606 A1* 6/2008 Dang et al. ................. 707/104.1
2008/0151851 A1* 6/2008 Sitch ............................. 370/338

FOREIGN PATENT DOCUMENTS

| CN | 1783822 A | 6/2006 |
|---|---|---|
| JP | 11041651 A | 2/1999 |
| JP | 2006-514818 A | 5/2006 |
| WO | 2004-066543 A2 | 8/2004 |

OTHER PUBLICATIONS

Kim, Ronny, "Information Service & IEEE 802.16 ND&S," IEEE 802.21 Media Independent Handover, presented at IEEE teleconference, Jan. 9, 2007, 12 pages.

IEEE, Standard for Conformance to IEEE 802.16, "Part 4: Protocol Implementation Conformance Statement (PICS) Proforma for Frequencies below 11GHZ," IEEE, Jan. 15, 2007, pp. 2-94.

\* cited by examiner

Figures of Specification

METHOD FOR ACCELERATING TERMINAL OF WIRELESS COMMUNICATION SYSTEM ACCESSING NETWORK

RELATED APPLICATION DATA

This application claims priority and benefit of PCT/CN2007/003921, filed Dec. 29, 2007, which claims priority from Chinese patent application no. 200710143444.0, filed Jul. 31, 2007, the entire contents of which are hereby incorporated by reference.

TECHNICAL FIELD

The present invention relates to an access network technique in a wireless communication system, and in particular, to a method for a wireless communication terminal to access a network.

BACKGROUND OF THE INVENTION

In current wireless networks, there are both operators of access networks and those of service networks, and an access network can be shared by a plurality of service networks and a geographical district can also be provided with services by a plurality of operators of access networks. In such a complex operating mode, functions for discovering and selecting a network become more and more important.

In current wireless communication networks, schemes for implementing network discovery and selection have their own characteristics, but in all these schemes, it is firstly required to acquire an identifier of a network, and then a terminal performs subsequent processing according to information stored in it.

Taking a WiMAX system as an example, in its newly released version of NWG1.1.0, a procedure and method for a WiMAX terminal to discover and select a network are described. Wherein, a procedure for discovering and selecting a network in the case that a terminal stores the configuration information generated when performing a relevant subscription is described. In this case, the base station can optimize the process of accessing the network, including discovering and selecting the network, by using the stored configuration information generated when subscribing. From this version, it can be seen that the current procedure of network discovery and selection as well as accessing based on "information on the last connection" or "configuration information generated when subscribing" comprises the following procedure sequences:

In the case based on "information on the last connection", a terminal performs a procedure of judging validity of the last download channel descriptor (DCD) count value prior to a procedure of judging validity of a network access provider ID (NAP ID) and a base station ID (BS ID). And if it judges that the DCD count value is invalid, the terminal continues to acquire messages such as a DCD message.

In the case based on "configuration information generated when subscribing", a terminal directly acquires messages such as a DCD message and then performs a procedure of judging validity of a NAP ID.

According to the IEEE802.16e-2005 protocol, a downlink mapping (DL-MAP) message includes a "DCD count value" and a "BS ID (including a NAP ID)", and a DCD message (a message sent by a BS periodically, defining characteristics of a downlink physical channel) includes a "configuration change count" and a "network service provider ID (NSP ID) change count value".

According to the IEEE802.16e-2005 protocol, in downlink synchronization, a terminal always receives a DL-MAP message first to obtain a "DCD count value" and a "BS ID (including NAP ID)", and then receives control messages such as a DCD message.

Therefore, it can be seen from the above analysis that according to the procedure in current protocols, although the terminal decodes a DL-MAP message first to obtain a "BS ID", a "NAP ID" and a "DCD count value", it does not judge validity of the "NAP ID" and "BS ID", leading to a result that even if the "NAP ID" or "BS ID" decoded from the DL-MAP is invalid, the terminal will still perform a subsequent procedure of obtaining messages such as a DCD message, thus increasing the time taken for a terminal to discover and select a network, and hence affecting the speed of network accessing of the terminal.

SUMMARY OF THE INVENTION

The technical problem to be solved in the present application is to provide a method for accelerating network accessing of a terminal in a wireless communication system in order to improve the existing procedure under the current protocol, reduce the time taken for a terminal to discover and select a network, and thereby increase the speed of network accessing of the terminal.

In order to solve the above technical problem, the present invention provides a method for accelerating network accessing of a terminal in a wireless communication system, comprising steps of:

(a) a wireless terminal receiving system parameter information, and after obtaining system information of a base station identifier (BS ID) and a network access provider identifier (NAP ID), immediately judging validity of the NAP ID, or validity of both the NAP ID and the BS ID;

(b) if a result of the judgment is "valid", the terminal proceeding to a subsequent procedure of the network discovery and selection according to information stored in the terminal; otherwise, carrying out a new procedure of network discovery and selection.

Furthermore, if the terminal stores information on previous connections, then in the step (a), the terminal judges validity of both the NAP ID and the BS ID;

if the terminal stores configuration information generated when subscribing, then in the step (a), the terminal judges validity of the NAP ID.

Furthermore, the subsequent procedure in the step (b) comprises receiving, parsing and processing physical channel parameter messages.

Furthermore, in the step (b), if a result of the judgment is "invalid", then the terminal starts a new procedure of network discovery and selection, instead of receiving, parsing and processing physical channel parameter messages according to a current protocol.

Furthermore, in the step (a), the terminal obtains the BS ID and the NAP ID as well as a download channel descriptor (DCD) count value by synchronizing a downlink channel and parsing a downlink mapping (DL-MAP) message.

Furthermore, in the step (a), the terminal stores information on previous connections and the subsequent procedure in the step (b) comprises steps of:

(b1) judging whether the DCD count value matches up with a DCD count value stored in the terminal; if yes, ending the network discovery and selection process, otherwise, proceeding to step (b2);

(b2) receiving, parsing and processing a DCD message and an upload channel descriptor (UCD) message as well as a network service provider identifier (NSP ID) change count value, and proceeding to a subsequent procedure according to a protocol.

Furthermore, in the step (a), the terminal stores configuration information generated when subscribing, and the subsequent procedure in the step (b) comprises:

receiving, parsing and processing a download channel descriptor (DCD) message and an upload channel descriptor (UCD) message as well as a network service provider (NSP) change count value, and proceeding to a subsequent procedure according to a protocol.

In the present invention, in a network discovery and selection procedure based on "pre-existing connection information", after a BS ID and a NAP ID are obtained through reception of information of a wireless communication system, validity of the BS ID and the NAP ID is judged first, and then a subsequent procedure is performed; or in a network discovery and selection procedure based on "pre-existing configuration information generated when subscribing", validity of the NAP ID is judged first and then a subsequent procedure is performed, thus avoiding continuing to perform a series of useless procedures such as message receiving and decoding in the case that the NAP ID or the BS ID is invalid according to the procedure in the current protocol, hence increasing the speed of network accessing of a terminal.

PREFERRED EMBODIMENTS OF THE PRESENT INVENTION

The method for accelerating network accessing of a terminal in a wireless communication system provided by the present invention comprises the following steps:

a wireless terminal receives system parameter information, and after obtaining system information of a BS ID and a NAP ID, it immediately judges validity of the NAP ID, or validity of both the BS ID and NAP ID;

if a result of the judgment is "valid", the terminal proceeds to a subsequent procedure of receiving, parsing and processing physical channel parameter messages; otherwise, it carries out a new procedure of network discovery and selection.

In the above steps of the method, only if the NAP ID, or both the BS ID and the NAP ID are valid, the terminal continues to receive and process the physical layer configuration messages, thus avoiding continuing to perform a process of receiving and processing physical layer configuration messages in the case that the NAP ID or BS ID is invalid, thereby accelerating the process of network discovery and selection by the terminal.

The above technical scheme of the present invention will be described in further detail in conjunction with specific embodiments and drawings.

Figure 1:
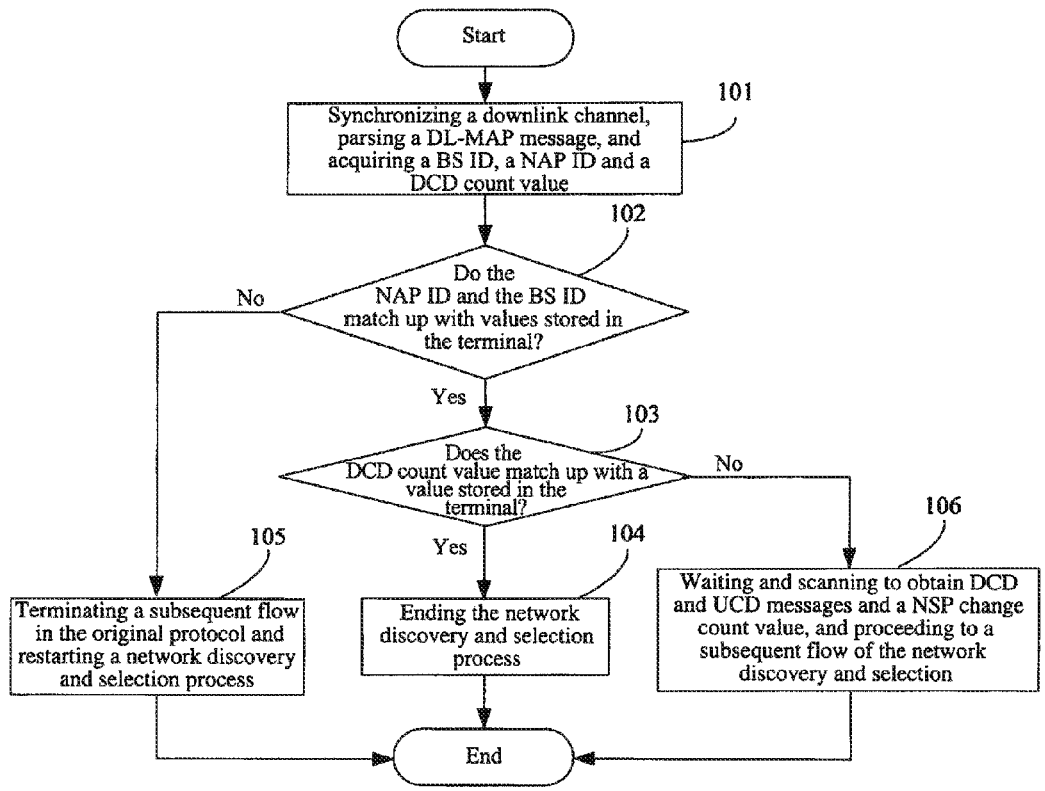
FIG. 1 is an optimized procedure of network discovery and selection based on information on the last connection in a WiMAX network according to an embodiment of the present invention.

In embodiment 1, if a terminal stores information on previous connections, the procedure of network discovery and selection implemented in this embodiment of the present invention is shown in FIG. 1, comprising the following steps of:

Step 101: synchronizing a downlink channel, parsing a DL-MAP message, and respectively acquiring a NAP ID, a BS ID and a DCD count value;

Step 102: judging whether the NAP ID and BS ID match up with values stored in the terminal; if yes, proceeding to step 103, otherwise turning to step 105;

Step 103: judging whether the DCD count value matches up with a value stored in the terminal; if yes, proceeding to step 104, otherwise, turning to step 106;

Step 104: ending the network discovery and selection; Step 105: terminating a subsequent procedure in the original protocol and restarting a process of network discovery and selection, i.e., the terminal does not have to receive, parse and process physical channel parameter messages according to the protocol;

Step 106: waiting and scanning to obtain DCD and upload channel descriptor (UCD) messages and a NSP change count value, and proceeding to a subsequent procedure according to the protocol.

Figure 2:
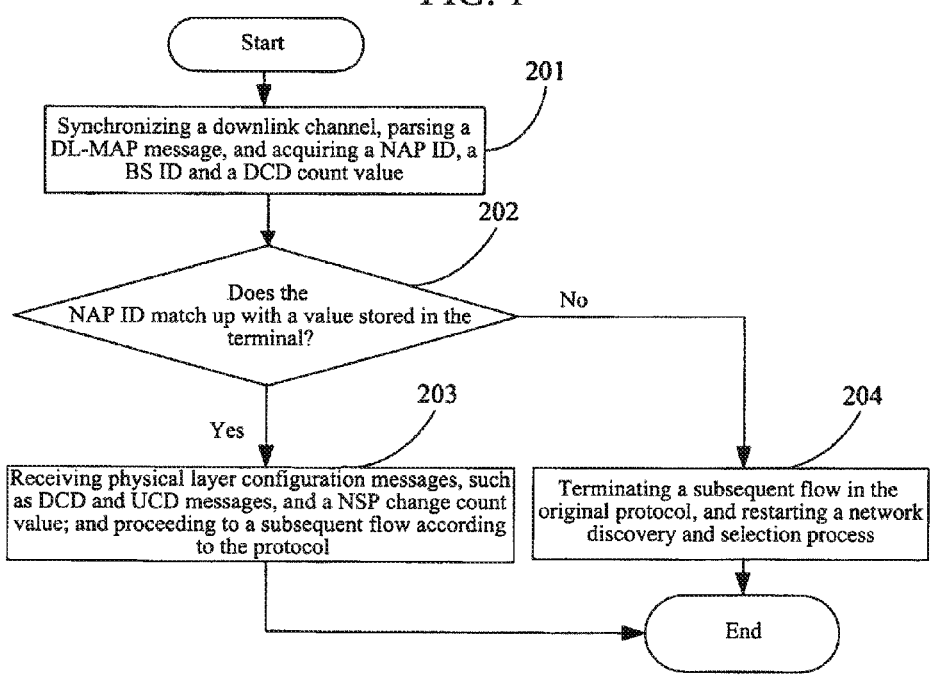
FIG. 2 is an optimized procedure of network discovery and selection based on configuration information generated when subscribing in a WiMAX network according to an embodiment of the present invention.

In embodiment 2, if a terminal stores configuration information generated when subscribing, the procedure of network discovery and selection implemented in this embodiment of the present invention is shown in FIG. 2, comprising the following steps of:

Step 201: synchronizing a downlink channel, parsing a DL-MAP message, and respectively acquiring a NAP ID, a BS ID and a DCD count value;

Step 202: judging whether the NAP ID matches up with the configuration information generated when subscribing stored in the terminal; if yes, proceeding to step 203, otherwise turning to step 204;

Step 203: receiving physical layer configuration messages, such as DCD and UCD messages, as well as a NSP change count value, and proceeding to a subsequent procedure according to the protocol;

Step 204: terminating a subsequent procedure in the original protocol, and restarting a process of network discovery and selection.

Although the present invention is disclosed with reference to the above preferred embodiments, those embodiments are not meant to limit the present invention, and any person skill in the art can make some variations and modifications without departing from the spirit and scope of the present invention. Therefore, it is intended that the protection scope of the present invention be limited by the claims appended hereto.

INDUSTRIAL APPLICABILITY

The present invention provides a method for accelerating network accessing of a terminal in a wireless communication system. In a network discovery and selection procedure based on "pre-existing connection information" or "pre-existing configuration information generated when subscribing", after a NAP ID and a BS ID are obtained through reception of system information, validity of the NAP ID or validity of both the NAP ID and the BS ID is judged first, and then a subsequent procedure is performed, thus avoiding continuing to perform a series of useless procedures such as message receiving and decoding in the case that the NAP ID or the BS ID is invalid according to the procedure in the current protocol, hence increasing the speed of network accessing of the terminal.

What we claim is:

1. A method for accelerating network accessing of a wireless terminal in a wireless communication system, comprising steps of:
   (a) a wireless terminal receiving system parameter information, and after obtaining system information of a base station identifier (BS ID) and a network access provider identifier (NAP ID), immediately judging validity of the NAP ID, or validity of both the NAP ID and the BS ID;
   (b) if a result of the judgment is "valid", the wireless terminal proceeding to a subsequent procedure of network discovery and selection according to information stored in the wireless terminal; otherwise, carrying out a new procedure of network discovery and selection.

2. The method according to claim 1, wherein:
   if the wireless terminal stores information on previous connections, then in the step (a), the wireless terminal judges validity of both the NAP ID and the BS ID;
   if the wireless terminal stores configuration information generated when subscribing, then in the step (a), the wireless terminal judges validity of the NAP ID.

3. The method according to claim 2, wherein in the step (a), the wireless terminal stores configuration information generated when subscribing, and the subsequent procedure in the step (b) comprises:
   receiving, parsing and processing a download channel descriptor (DCD) message and an upload channel descriptor (UCD) message as well as a network service provider (NSP) change count value, and proceeding to a subsequent procedure according to a protocol.

4. The method according to claim 1, wherein the subsequent procedure in the step (b) comprises receiving, parsing and processing physical channel parameter messages.

5. The method according to claim 1, wherein in the step (b), if a result of the judgment is "invalid", then the wireless terminal starts a new procedure of network discovery and selection, instead of receiving, parsing and processing physical channel parameter messages according to a current protocol.

6. The method according to claim 1, wherein in the step (a), the wireless terminal obtains the BS ID and the NAP ID as well as a download channel descriptor (DCD) count value by synchronizing a downlink channel and parsing a downlink mapping (DL-MAP) message.

7. A method according to claim 6, wherein in the step (a), the wireless terminal stores information on previous connections and the subsequent procedure in the step (b) comprises steps of:
   (b1) judging whether the DCD count value matches up with a DCD count value stored in the wireless terminal; if yes, ending the network discovery and selection, otherwise, proceeding to step (b2);
   (b2) receiving, parsing and processing a DCD message and an upload channel descriptor (UCD) message as well as a network service provider (NSP) change count value, and proceeding to a subsequent procedure according to a protocol.

* * * * *